United States Patent [19]

Davis et al.

[11] Patent Number: 4,786,902

[45] Date of Patent: Nov. 22, 1988

[54] CONTROL INTERFACE FOR COMBINED WATCH AND PAGER FUNCTIONS

[75] Inventors: Walter L. Davis, Coral Springs; Philip P. Macnak, West Palm Beach, both of Fla.

[73] Assignee: Motorola, Inc., Schaumburg, Ill.

[21] Appl. No.: 16,895

[22] PCT Filed: Jan. 2, 1987

[86] PCT No.: PCT/US87/00003

§ 371 Date: Feb. 20, 1987

§ 102(e) Date: Feb. 20, 1987

[87] PCT Pub. No.: WO88/05184

PCT Pub. Date: Jul. 14, 1988

[51] Int. Cl.[4] ........................ H04B 7/00; H04Q 7/00; G04G 9/00; G08B 3/10

[52] U.S. Cl. ...................... 340/825.440; 340/365 VL; 340/825.560; 368/11

[58] Field of Search .................. 340/825.44, 365 VL, 340/712, 825.56; 368/11

[56] References Cited

U.S. PATENT DOCUMENTS

| | | | |
|---|---|---|---|
| 3,937,004 | 2/1976 | Natori et al. | 340/825.44 |
| 4,010,460 | 3/1977 | DeRosa | 340/825.48 |
| 4,232,301 | 11/1980 | Nomoto | 340/789 |
| 4,320,387 | 3/1982 | Powell | 340/825.34 |
| 4,365,243 | 12/1982 | Perotto et al. | 340/365 VL |
| 4,644,352 | 2/1987 | Fujii | 340/825.44 |

FOREIGN PATENT DOCUMENTS

| | | |
|---|---|---|
| 2606691 | 9/1977 | Fed. Rep. of Germany . |
| 2918531 | 11/1980 | Fed. Rep. of Germany . |
| 3043867 | 7/1982 | Fed. Rep. of Germany . |

OTHER PUBLICATIONS

EPO1846062, Jun. 18, 1986, D. G. Hoff.

Abstracts of Patents, Japan, vol. 3, No. 13 (E-88), Feb. 7, 1979 & JP, A53139570 (Suwa Seikosha K.K.), Dec. 5, 1978.

*Primary Examiner*—Donald J. Yusko

*Attorney, Agent, or Firm*—Joseph T. Downey; Anthony J. Sarli, Jr.; Donald B. Southard

[57] ABSTRACT

A wrist worn device includes a digital watch circuit and a receiver circuit which responds to coded message signals including selective call signalling and message information. An input steering circuit interfaces between the watch circuit and the receiver circuit for normally providing control of the watch circuit by switches located in the device case. The normal watch functions of the switches are permanently marked on the device case. The watch circuit and the receiver circuit couple to an information selector circuit which normally selects the watch output for a common display. When coded message signals are received, the switches are enabled to control the receiver circuit, and the received message information is selected for display. New indicia, electronically selected by the information selector circuit, are displayed on the display defining the new functions of the switches.

45 Claims, 14 Drawing Sheets

CONTROL INTERFACE FOR COMBINED WATCH AND PAGER FUNCTIONS

BACKGROUND OF THE INVENTION

This invention relates generally to the field of controllers suitable for use with miniature personal communications devices, and more particularly to a switch function controller for use with digital electronic watches which incorporate a radio paging receiver.

The small physical size and form factor of wrist worn digital electronic watches having LCD or LED displays makes it very difficult to provide individual control switches for each and every function which can be provided in the watches. As a result, watch manufacturers have had to devote considerable effort to minimize the number of control switches required to set and control the watch functions. This has resulted in providing only a limited number of control switches providing multiple function capability on the watches. Selection and control of all of the available functions requires sequences of control switch operations to be performed which are not always readily apparent, even with the identification of the switch functions on the watch case.

When a radio paging receiver is also included in the same case as the watch, the problem is further complicated. This is due to the large number of distinctly different functions which are required for control of a paging receiver. It has been the experience of paging receiver manufacturers that these functions must be clearly identified to avoid confusion or the loss of messages due to improper operation of the controls by the user. Device case size limits simply adding additional control switches for the paging receiver functions. Multiplexing control of the additional functions required for the paging receiver functions with those of the watch functions using the same control switches can create confusion in the operation of the watch and paging receiver functions. Other problems, such as when to provide operation of the paging receiver or the watch functions by the control switches, how long and how often, and how to handle information delivered by the paging receiver have not been but need to be addressed.

SUMMARY OF THE INVENTION

It is an object of the present invention to provide an apparatus suitable for controlling the operation of a electronic watch and a paging receiver incorporated in a single wrist worn device.

It is a further object of the invention to provide an apparatus which minimizes the number of control switches required to operate the watch and paging receiver functions.

It is a further object of the invention to provide an apparatus which clearly identifies the functions provided by the control switches.

It is a further object of the invention to provide an âpparatus which automatically provides operation of the paging receiver functions when control of these functions are required.

It is a further object of the invention to provide an apparatus which automatically provides operation of the watch functions by the control switches, when not required to control the paging receiver functions.

It is a further object of the invention to provide an apparatus which allows manual selection of either watch functions or paging receiver functions.

It is a further object of the invention to provide an apparatus which controls the display of time information and message information under the control of the control switch functions.

A switch control interface arrangement is provided for a device normally generating and displaying time information, and also capable of receiving transmitted coded message signals. Switches for controlling the setting and display of time are provided. The device case is marked with permanent indicia positionally adjacent the switches for indicating the switch functions. The device includes a receiver circuit for receiving and decoding the transmitted coded message signals to provide control signals and information. A switch controller is coupled to the time generating circuit and to the receiver circuit and enables control of either the time generating circuit and receiver circuit by the switches. Control of the receiver circuit by the switches is automatically obtained when the control signals are derived in the receiver circuit.

In another embodiment of the present invention a display control interface arrangement is provided for a device normally generating and displaying time information, and also capable of receiving transmitted coded message signals. Switches for controlling the setting and display of time are provided. The device case is marked with permanent indicia positionally adjacent the switches for indicating the switch functions. The device includes a receiver circuit for receiving and decoding the transmitted coded message signals to provide control signals and message information. An input steering circuit is coupled to the time generating circuit and to the receiver circuit and enables control of either the time generating circuit or the receiver circuit by the switches. Outputs from the time generating circuit and the receiver circuit are coupled to an information selector circuit which selects either time or message information depending upon whether the time generating circuit or the receiver circuit is selected by the input steering circuit. Control of the receiver circuit and display of message information by the switches is automatically obtained when the control signals are derived in the receiver circuit.

In yet another embodiment of the present invention a display control interface arrangement is provided for a wrist worn device normally generating and displaying time information, and also capable of receiving transmitted coded message signals. The transmitted coded message signal include selective call signalling and message information. Switches for controlling the setting and display of time are provided. The device case is marked with permanent indicia positionally adjacent the switches for indicating the switch functions. The device includes a receiver circuit for receiving and demodulating the coded message signals including the selective call signalling and message information. An identification storage element stores predetermined device identification information. A decoder compares the selective call signalling with the predetermined device identification information to provide control signals when the selective call signalling matches the predetermined device identification information. An input steering circuit is coupled to the time generating circuit and to the receiver circuit and enables control of either the time generating circuit or the receiver circuit by the switches. Outputs from the time generating circuit and the receiver circuit are coupled to an information selector circuit which selects either time or message information depending upon whether the time generating circuit or the receiver circuit is selected by the input steering circuit. The information selector circuit also electronically selects indicia displayed positionally adjacent the switches indicating the new switch functions which are also enabled when the receiver circuit is selected by the input steering circuit. Control of the receiver circuit by the switches, display of the message information, and display of indicia idicating new switch functions, is automatically obtained when the control signals are derived in the receiver circuit.

These and other objects and advantages of the present invention will become apparent to those skilled in the art upon consideration of the following description and accompanying drawings of the invention.

BRIEF DESCRIPTION OF THE DRAWINGS

The features of the invention which are believed to be novel are set forth with particularity in the appended claims. The invention itself, together with further objects and advantages thereof, may be best understood by reference to the following description when taken in conjunction with the accompanying drawings, in the several figures of which like reference numerals identify identical elements, in which:

DESCRIPTION OF THE PREFERRED EMBODIMENT

Figure 1:
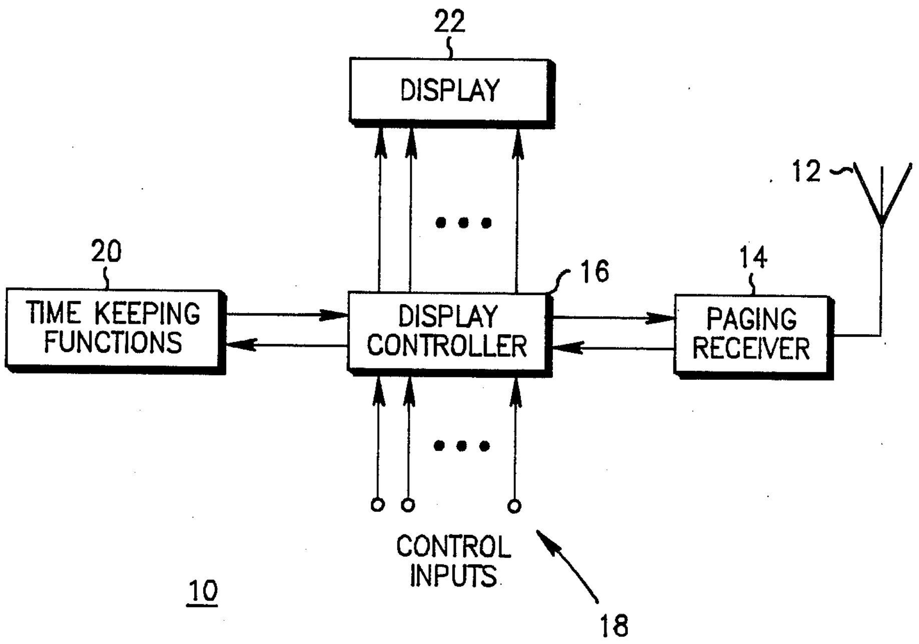
FIG. 1 is a simplified functional block diagram of the apparatus of the present invention.

Reference is now directed to the drawings, and in particular to FIG. 1, which represents a simplified functional block diagram for a device 10 constructed in accordance with the present invention. An electronic watch circuit 20, which is coupled to display controller 16, provides time information such as time and day and date, normally displayed on display 22. An antenna 12 is coupled to a paging receiver 14, which is also coupled to display controller 16. Paging receiver 14 receives transmitted coded message signals and displays the received message information on display 22 in place of the time. It will be appreciated by one skilled in the art that the time information being generated and displayed by watch circuit 20 may include other functions such as elapsed time, interval timer, and alarm, just to name a few. Control of watch circuit 20 and paging receiver 14 is provided by user control inputs 18, which couple to display controller 16. As will be described in greater detail later, control inputs 18 are intended to represent device switches 40, 42 and 44 illustrated in FIG. 3A.

In normal operation, the watch-pager arrangement of FIG. 1 functions like a watch with the present time displayed on display 22. The device switches, which are the control inputs 18, provide control of the watch functions through display controller 16. However, when transmitted coded message signals, or pages, are received and decoded by paging receiver 14, in a manner well known to one skilled in the art, a control signal is generated by paging receiver 14 which is coupled to display controller 16 causing the watch-pager arrangement to function as a display pager. This is effected by changing both the information displayed and the normal function of the device switches. Thus, immediately after the page has been received, the display indicates a message was received. Paging receiver 14 normally includes a memory for storage of the message information. Readout of the message information stored in the memory is then controllable by the same device switches normally used to control the watch functions.

Figure 2:
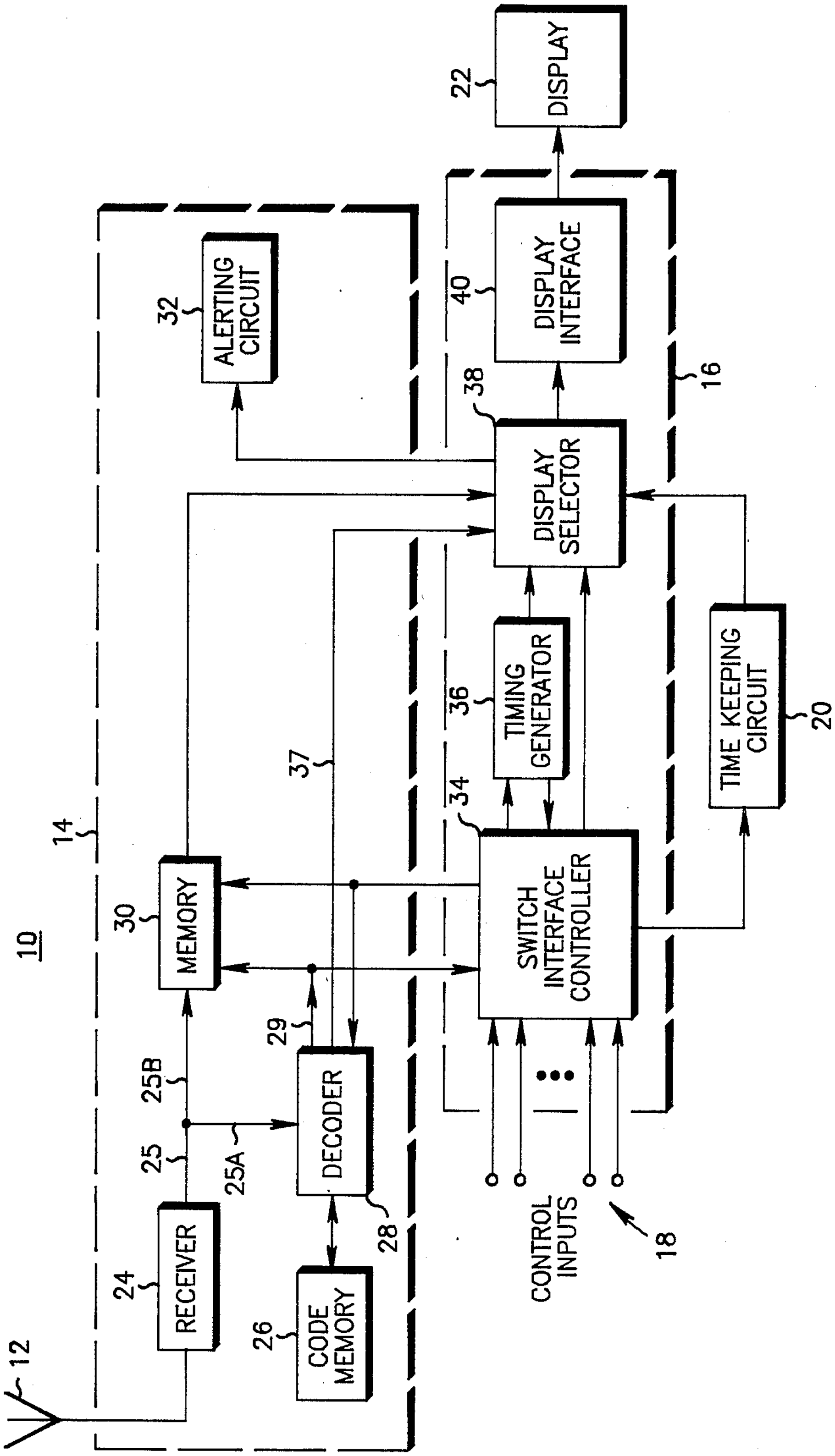
FIG. 2 is an functional block diagram of the apparatus of the present invention illustrating the details of the functional blocks shown in FIG. 1.

Reference is next directed to FIG. 2 which shows a more detailed block diagram of the present invention. Display controller 16 is shown to consist of a switch interface controller 34 used for steering control inputs 18 to the appropriate section, either the watch, or time keeping circuit 20 or paging receiver 14. Implementations for watch circuit 20 and paging receiver 14 are separately well known to those skilled in the art, and will only be briefly described later. Outputs from watch circuit 20 and paging receiver 14 provide serial time and message information, respectively, to display selector 38. Display selector 38 is coupled to switch interface controller 34 and selects time or message information for display depending upon which section of the watch-pager device is being controlled by switch interface controller 34. The information selected by display selector 38 is provided to display interface circuit 40 which, in the preferred embodiment of the present invention described, includes a serial driver circuit, such as the MC145000 master and MC145001 slave, serial multiplexed LCD driver circuits manufactured by Motorola, which is suitable for driving display 22. Display 22 comprises an LCD display suitable for displaying both time and message information, such as multiplexed LCD displays available from Seiko.

Paging receiver 14 consists of an antenna 12 coupled to receiver circuit 24 as shown in FIG. 2. Receiver 24 receives the transmitted coded message signals which normally consist of transmitted selective call signalling information and transmitted message information in a manner well known in the art. The transmitted coded message signals are demodulated in receiver 24, again in a manner well known to one skilled in the art, and provided at the output of receiver 24 as a stream of binary information representing demodulated coded message signals 25, consisting of selective call signalling information 25*a* and message information 25*b*. The output of receiver 24 is coupled to a decoder circuit 28. Decoder 28 has a second input from code memory, or code plug 26. Code plug 26 stores predetermined address information consisting of one or more addresses to which paging receiver 14 will respond. The demodulated selective call signalling information 25*a* is compared with the addresses stored in code plug 26 by decoder 28. If the selective call signalling information 25*a* matches one of the stored addresses, a control signal 29 is generated. Control signal 29 is coupled to memory 30 to effect any subsequently received message information 25*b* to be stored. It will be appreciated by one skilled in the art, that memory 30 may be capable of storing multiple messages received at different times. Control signal 29 also couples to switch interface controller 34 to effect con trol of paging receiver 14 by the device switches. After the message information **25*b* has been stored, decoder 28 generates an alerting signal 37 which is routed to display selector 38. Display selector 38 sends the alerting signal 37 to the alerting circuit 32. Alerting circuit 32 normally delivers an audible alert, although other forms a alert such as tactile could also be delivered. It will be appreciated the alerting circuit 32 may deliver alerting signals derived from watch circuit 20 during normal operation, such as when an alarm signals are generated by watch circuit 20**.

Switch interface controller 34 also couples to timing generator circuit 36 as shown in FIG. 2. Timing generator 36 controls the time duration during which the received message information is displayed on display 22. When switch interface controller 34 selects paging receiver 14 in response to control signal 29, a predetermined display time interval such as eight seconds is generated. Upon completion of the display time interval, timing generator 36 generates an output to cause switch interface controller 34 to again select the watch functions. In the preferred embodiment of the present invention, timing generator 36 also provides an output which couples to display selector 38 to provide the clock signals necessary to drive the serial display driver circuitry in display interface 40 which is subsequently coupled to display 22.

Figure 3A:
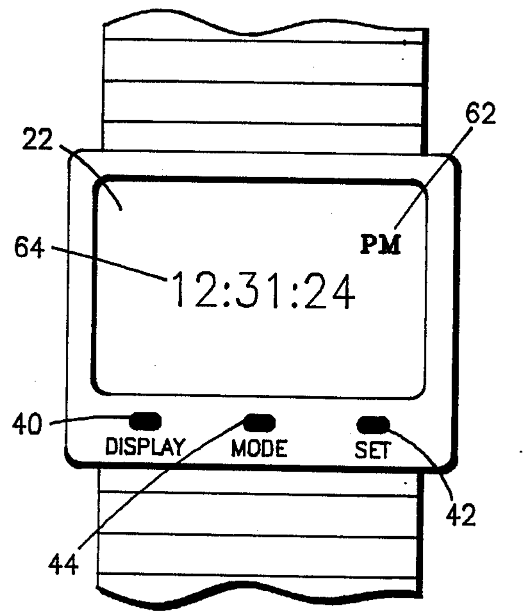
FIGS. 3A to 3H are pictorial diagrams of the display portion of the device illustrating the switch control placement and indicia provided to control the operation of the apparatus of the present invention.
Figure 3B:
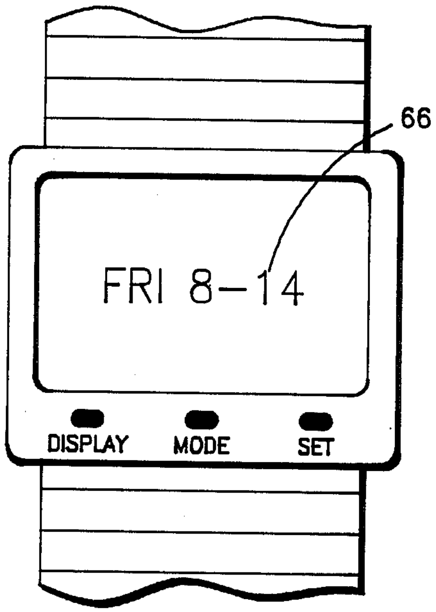
Figure 4A:
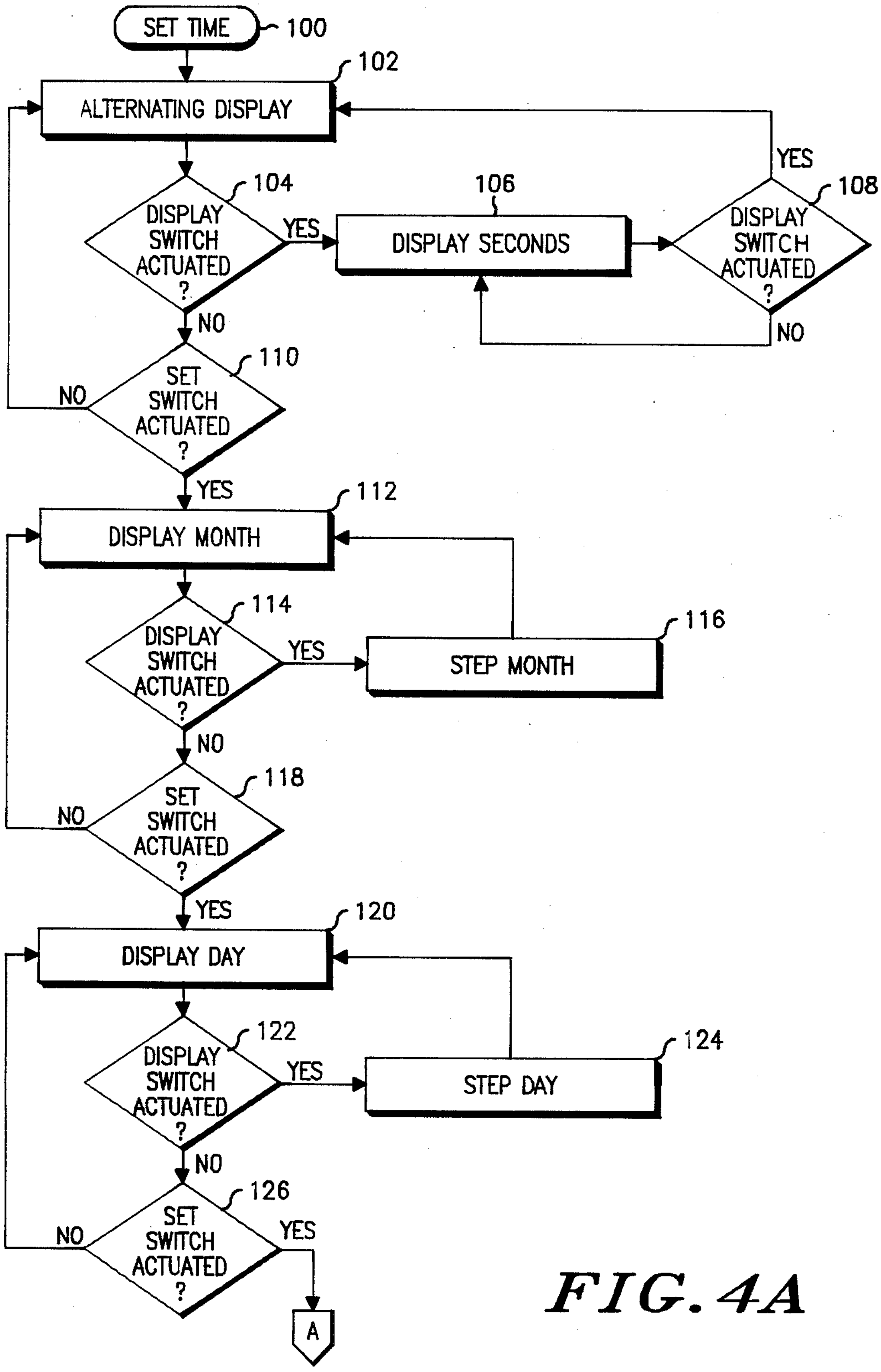
FIGS. 4A to 4G are flow diagrams illustrating the operation of the apparatus of the present invention.

As described earlier, control inputs 18 correspond to the device switches 40, 42 and 44. To better understand their operation reference is made to FIG. 3A where the device switches are shown to include a display switch 40, a set switch 42 and a mode switch 44. The switch functions are permanently marked on the case of the watch-pager device and indicate functions controlled by the switches when in the normal watch, or time display mode. In the preferred embodiment of the present invention, operation of watch circuit 20 functions are described as follows. Actuation of display switch 40 while time information, such as present time 64 and AM/PM indicator 62 are being displayed on display 22 as shown in FIG. 3A causes day and date information 66 to be displayed, as shown in FIG. 3B, for a period of time, such as for a two second interval. Additional operations, such as display of seconds, are also controlled by the display switch 40. These time display operations are described in the flowcharts shown in FIGS. 4A and 4C to be described in greater detail later. Actuation of set switch 42 will place watch circuit 20 in the time setting mode as described in the flowchart shown in FIGS. 4A and 4B, also to be described in greater detail later. Actuation of mode switch 44 will select control of paging receiver 14 by the device switches when time information is being displayed, to be described in detail with the flowchart shown in FIGS. 4C and 4D.

Figure 3C:
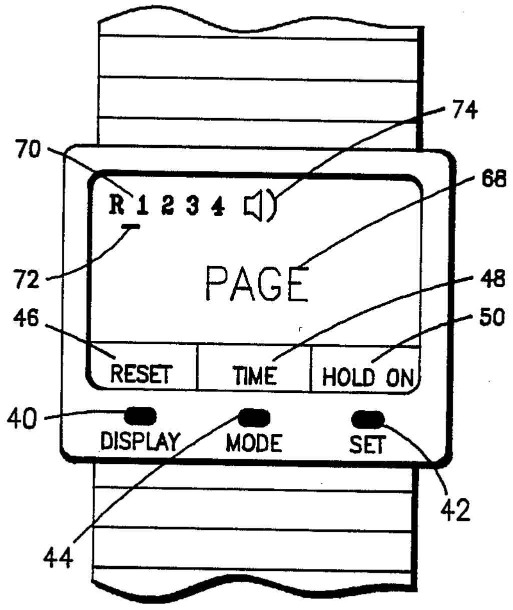
Figure 3D:
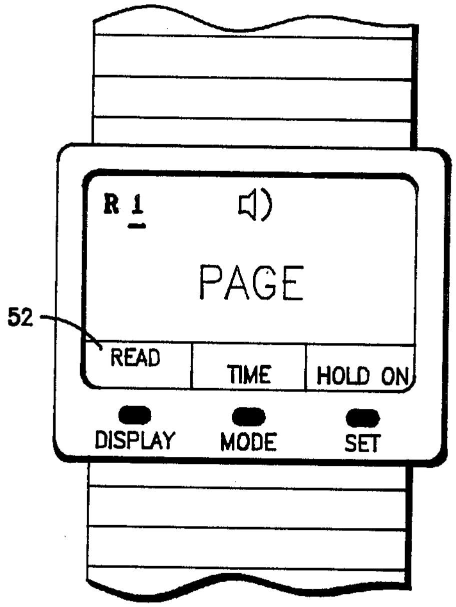

When the paging functions are selected as previously described, display selector 38 changes from the time display shown in FIG. 3A to a message display such as that shown in FIG. 3C. As illustrated in FIG. 3C, in the preferred embodiment of the present invention, the received message information **25*b* stored in memory 30 is not immediately displayed, but rather the text message, "PAGE" 68, is displayed indicating the presence of a stored received message. A visual annunciator 70 consisting of five alphanumeric characters, "R", "1", "2", "3", and "4" provides information on the number of received messages currently stored in memory 30. All annunciators are shown in FIG. 3C for the sake of clarity. Normally when no messages have been stored, only the "R" indicator is displayed and cursor 72 would be positioned beneath the "R" indicator. When a first message is received, only the "R" and the "1" indicators are displayed with cursor 72 positioned immediately beneath the "1" indicator as shown in FIG. 3D. Cursor 72 remains beneath the current unread memory position indicator until the received message has been read, at which time cursor 72 would again shift to beneath the "R" indicator. Additional messages are indicated by the "2", "3" and "4" indicators. The preferred embodiment of the present invention described provides an indication for four received messages to be stored and identified by annunciator 70**. The method for storing and displaying the received unread messages is described in detail in U.S. Pat. No. 4,385,295 to Willard, et al, entitled "Pager with Visible Display Indicating Unread Messages" which is assigned to the assignee of the present invention, the disclosure of which is hereby incorporated for reference herein. It should be noted that other methods for displaying the number of received messages which are stored may be employed without departing from the scope or spirit of the present invention.

Figure 3E:
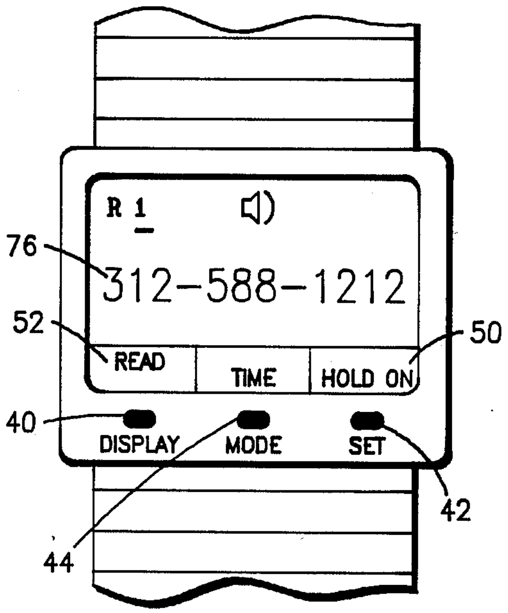

When the paging functions are selected by switch interface controller 34, switch labels indicating the new switch functions are also displayed. The new labels are provided by activating the appropriate portions of display 22 and include the labels "Reset" 46, "Time" 48 and "Hold On" 50 as shown in FIG. 3C. Display switch 40, used normally to control the display of time information as previously described, functions as a "Reset" switch 46 when paging receiver 14 is selected by switch interface controller 34. When "Reset" switch 46 is actuated, the audible alert generated by decoder 28 in response to receiving a page is suspended and the stored received message 76 is displayed as shown in FIG. 3E. The label identifying display switch 40 next changes to indicate a different switch function such as "Read" 52, also shown in FIG. 3E, after the audible alert has been reset and the received message has been initially read and displayed. Thus the preferred embodiment of the present invention provides multiple displayable labels for each switch, to clearly indicate the current switch function provided by that switch when multiple functions are provided by the switch. FIGS. 3C and 3E illustrate by example the multiple labels "Reset" 46 and "Read" 52 defining separate functions controlled by display switch 40.

Figure 3F:
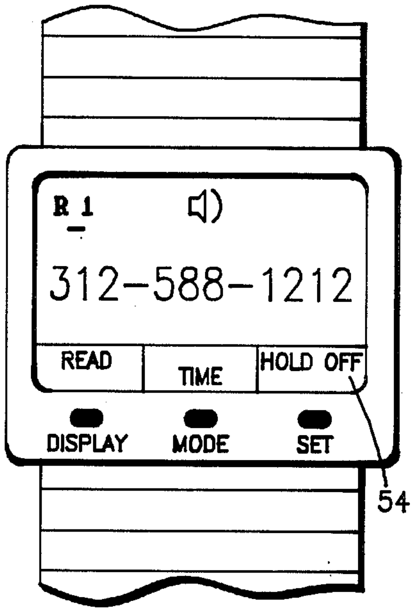

Set switch 42, shown in FIG. 3E normally used to control the setting the time, functions as the "Hold On" switch 50 when paging receiver 14 is selected by switch interface controller 34. The "Hold on" switch 50 allows freezing the received message 76 on display 22 for as long as required by suspending timing generator 36 operation. After "Hold On" switch 50 has been actuated, the switch function changes to "Hold Off" switch 54 as shown in FIG. 3F. Depressing the "Hold Off" switch 54 restarts timing generator 36, thereby returning operation to the watch mode when the display time interval has elapsed.

Mode switch 44, shown in FIGS. 3A to 3H, used to select the paging receiver function when present time is displayed, is used to manually reselect the normal watch or "Time" 48 function prior to timing generator 36 automatically restoring the time functions.

Figure 3G:
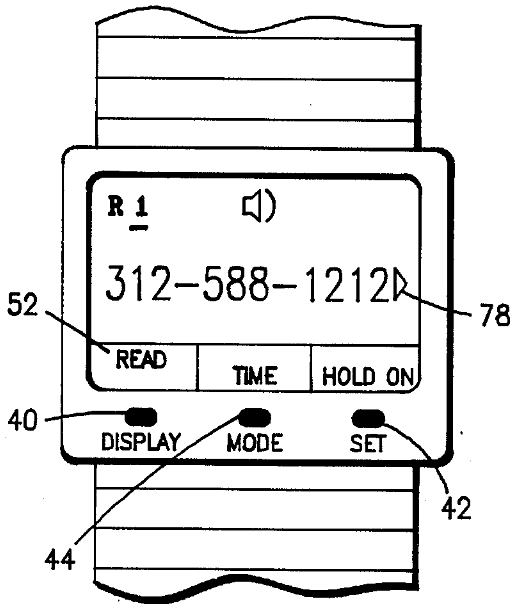

While the preferred embodiment of the present invention illustrates only a single twelve digit display, such as shown in FIG. 3E, it will be appreciated by one skilled in the art that longer messages may be transmitted, stored and displayed One method of handling longer messages is shown in FIG. 3G. A message continuation annunciator 78 is displayed indicating further information has been received and the information may be read by actuating display switch 40 providing the "Read" 52 function to read out the next segment of the received message. Other methods, such as the use of multiple line displays can also be employed without departing from the scope or spirit of the present invention described herein.

Figure 3H:
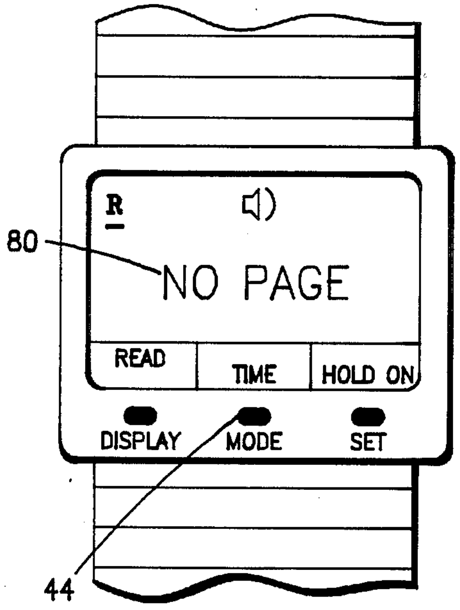

FIG. 3H illustrates the information displayed when the paging receiver function is manually selected using mode switch 44 when no pages have been received and stored. Text indicating "No Page" 80 is generated by decoder 28 and displayed as shown. It should also be observed that the switch functions are changed and the new labels are displayed as a result of manually selecting the message display mode. The normal time display may be reselected by actuating mode switch 44 which provides selecting the "Time" 48 function.

Many such time set/display protocols are known, but the following is a description of that employed in the preferred embodiment of the present invention. Reference is now directed to the flowchart shown in FIGS. 4A and 4B which describes the procedure to set the time for the watch-pager device 10. To enter the set time procedure at block 100, set switch 42 is actuated as shown at block 166 of the flowchart shown in FIGS. 4D and 4E which describes the general operation of the watch-pager device 10 to be described in detail later. The display alternates between time and day/date displays as shown at block 102 in FIGS. 4A and 4B. When display switch 40 is actuated at block 104, the seconds are displayed as shown at block 106. The seconds display shown at block 106 continues until display switch 40 is again actuated as shown at block 108, thereby returning the display to the alternating mode shown at block 102. If display switch 40 is not actuated as shown at block 104, and if set switch 42 is not actuated as shown at block 110, the display continues to alternate time and day/date information shown at block 102.

When set switch 42 is actuated as shown at block 110, the month is displayed as shown at block 112 thereby allowing the month to be set. When display switch 40 is actuated as shown at block 114 the month displayed is advanced to the next month as shown at block 116. If display switch 40 is not actuated as shown at block 114 and set switch 42 is not actuated as shown at block 118, the month displayed continues as shown at block 112.

When set switch 42 is actuated as shown at block 118, the day is displayed as shown at block 120 thereby allowing the day to be set. When display switch 40 is actuated as shown at block 122 the day displayed is advanced to the next day as shown at block 124. If display switch 40 is not actuated as shown at block 114 and set switch 42 is not actuated as shown at block 126, the day displayed continues as shown at block 120.

When set switch 42 is actuated as shown at block 126, the hour is displayed as shown at block 128 thereby allowing the hours to be set. When display switch 40 is actuated as shown at block 130 the hour displayed is advanced to the next hour as shown at block 132. If display switch 40 is not actuated as shown at block 130 and set switch 42 is not actuated as shown at block 134, the hour displayed continues as shown at block 128.

When set switch 42 is actuated as shown at block 134 the minute is displayed as shown at block 136 thereby allowing the minutes to be set. When display switch 40 is actuated as shown at block 138 the minute displayed is advanced to the next minute 140. If display switch 40 is not actuated as shown at block 138 and set switch 42 is not actuated as shown at block 142, the minute displayed 136 continues as shown at block 136. When set switch 42 is actuated as shown at block 142 the normal time display is obtained as shown at block 146, thus completing the present time setting procedure started at block 100.

Figure 4B:
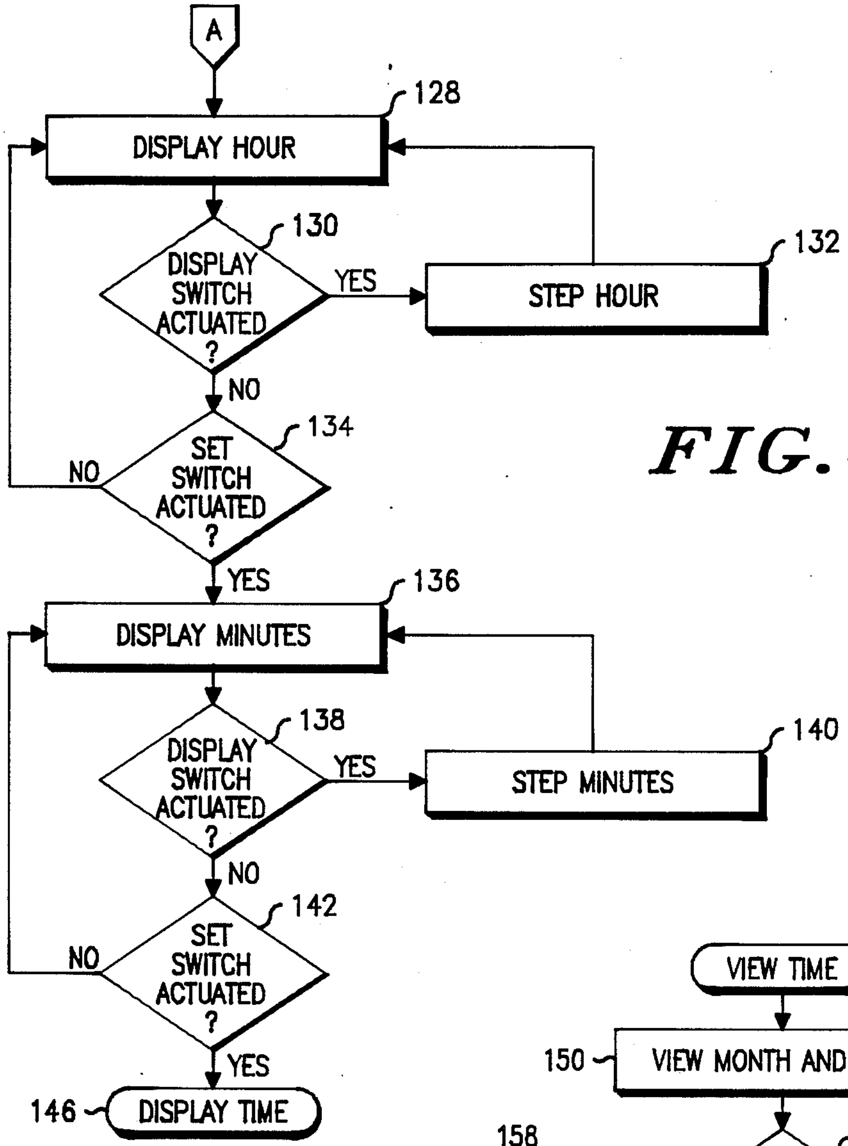
Figure 4C:
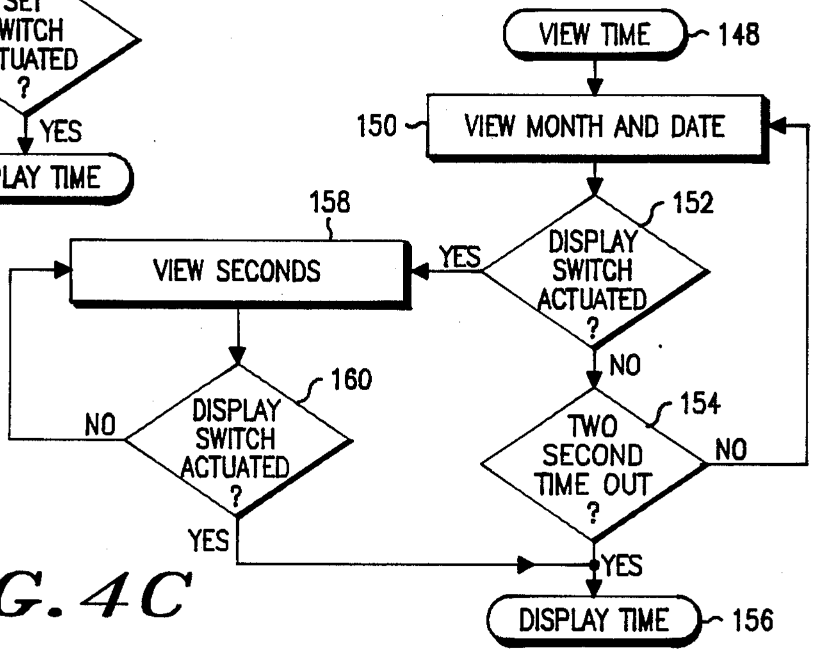

Reference is now directed the flowchart shown in FIG. 4C which describes the procedure to view day/-date and seconds. To enter the view time procedure at block 148, display switch 40 is actuated as shown at block 168 of the flowchart shown in FIGS. 4D and 4E which describes the general operation of the watch-pager device 10 to be described in detail later. The day/date are displayed as shown at block 150 when the view time procedure at block 148 is entered as shown in FIG. 4B. If display switch 40 is not actuated as shown at block 152 and the two second time period as shown at block 154 has not elapsed, the day/date displayed continues as shown at block 150. When the two second time period has elapsed as shown at block 154, the normal time display is obtained as shown at block 156, thus completing the view time procedure started at block 148.

If the display button is actuated as shown at block 152, then seconds are displayed as shown at block 158. If display switch 40 is not depressed as shown at block 160, the seconds displayed continues as shown at block 158. When display switch 40 is depressed as shown at block 160 are displayed, the normal time display is obtained as shown at block 156, thus completing the view time procedure started at block 148.

It will be appreciated by those skilled in the art that other procedures to display time and day/date information may be employed without departing from the scope and spirit of the invention described. It will also be appreciated that other timing functions, well known to those skilled in the art, may also be employed without departing from the scope or spirit of the invention described.

Figure 4D:
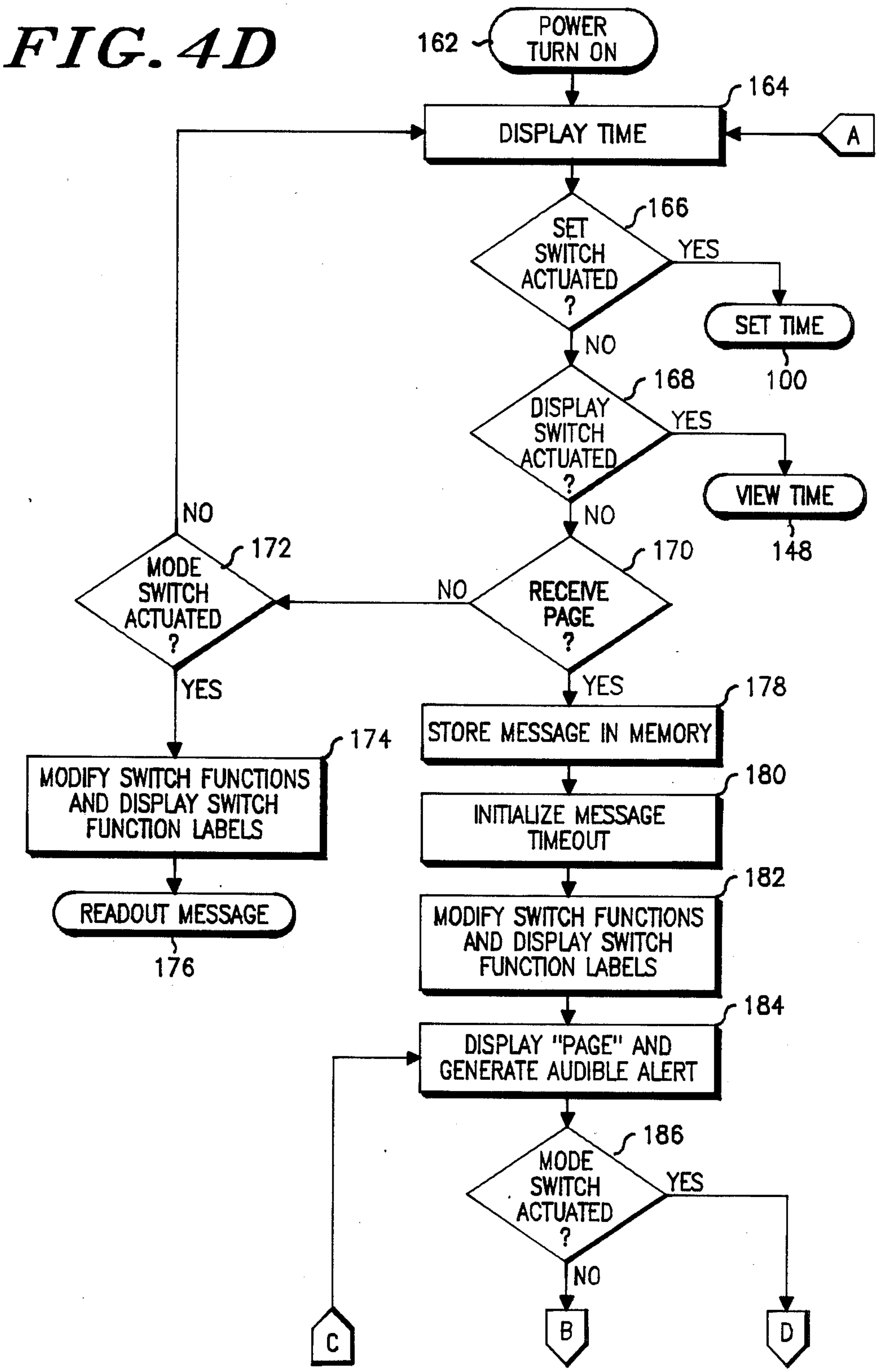
Figure 4E:
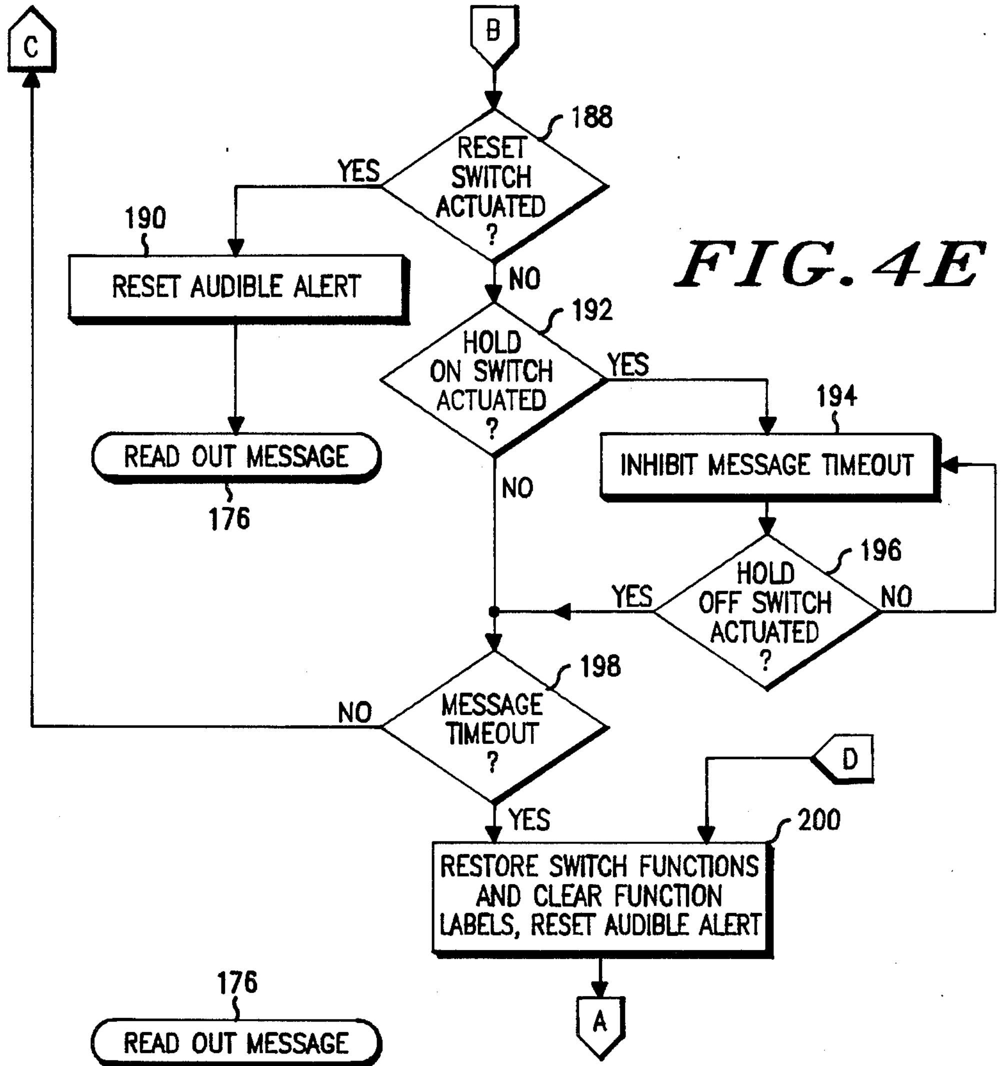

Reference is now directed to FIGS. 4D amd 4E which describes the general operation of the watch-pager device 10. While the watch-pager device 10 described in the embodiment of the present invention does not have a power control switch, power is turned on as shown at block 162 when the battery has been replaced. Time is normally displayed as shown at block 164 when power is supplied. When the set switch 42 is actuated as shown in block 166, the time setting procedure as shown at block 100 is entered, as previously described. When the display switch 40 is actuated as shown in block 168, the view time procedure as shown at block 148 is enetered, also as previously described. If a page has not been received as shown at block 170, but the mode switch 44 has been actuated as shown at block 172 the switch functions are modified as previously described, and new switch function labels are generated on the display as shown at block 174, placing the device in the message readout procedure shown at block 176. The message readout procedure shown at block 176 will be described in detail later.

When a page is received as shown at block 170 the received message is stored in memory 30 as shown at block 178. The display duration timeout is initialized as shown at block 180 and the switch functions are modified and new switch function labels are generated on the display as shown at block 182, thereby placing the device in the paging receiver mode. The text "Page" is generated and an audible alert is sounded as shown at block 184. If the mode switch 44, now having the "Time" select switch 48 function, is actuated as shown at block 186, the normal switch functions are restored, the displayed switch labels are cleared, and the audible alert is reset as shown at block 200, thereby returning the device to the normal time display mode shown at block 164. If the display switch 40, having the "Reset" switch 46 function, is actuated as shown at block 188, the audible alert is reset as shown at block 190, and the message readout procedure 176 is entered. If the set switch 42, having the "Hold On" switch 50 function, is actuated as shown at block 192, message timeout is inhibited as shown at block 194. The message displayed is frozen until the set switch 42, having the "Hold Off" switch 54 function, is actuated as shown at block 196. If the set switch 42, having the "Hold On" switch 50 function, was not actuated as shown at block 192, and message timeout occurs as shown at block 198, the normal switch functions are restored, the displayed switch labels are cleared, and the audible alert is reset as shown at block 200, thereby returning the device to the normal time display mode shown at block 164.

Figure 4F:
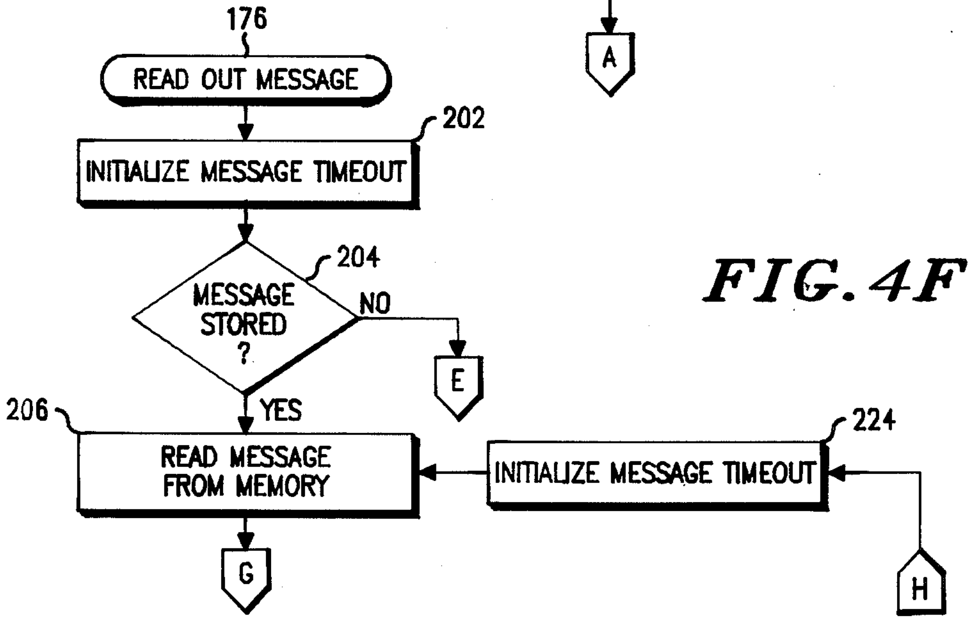
Figure 4G:
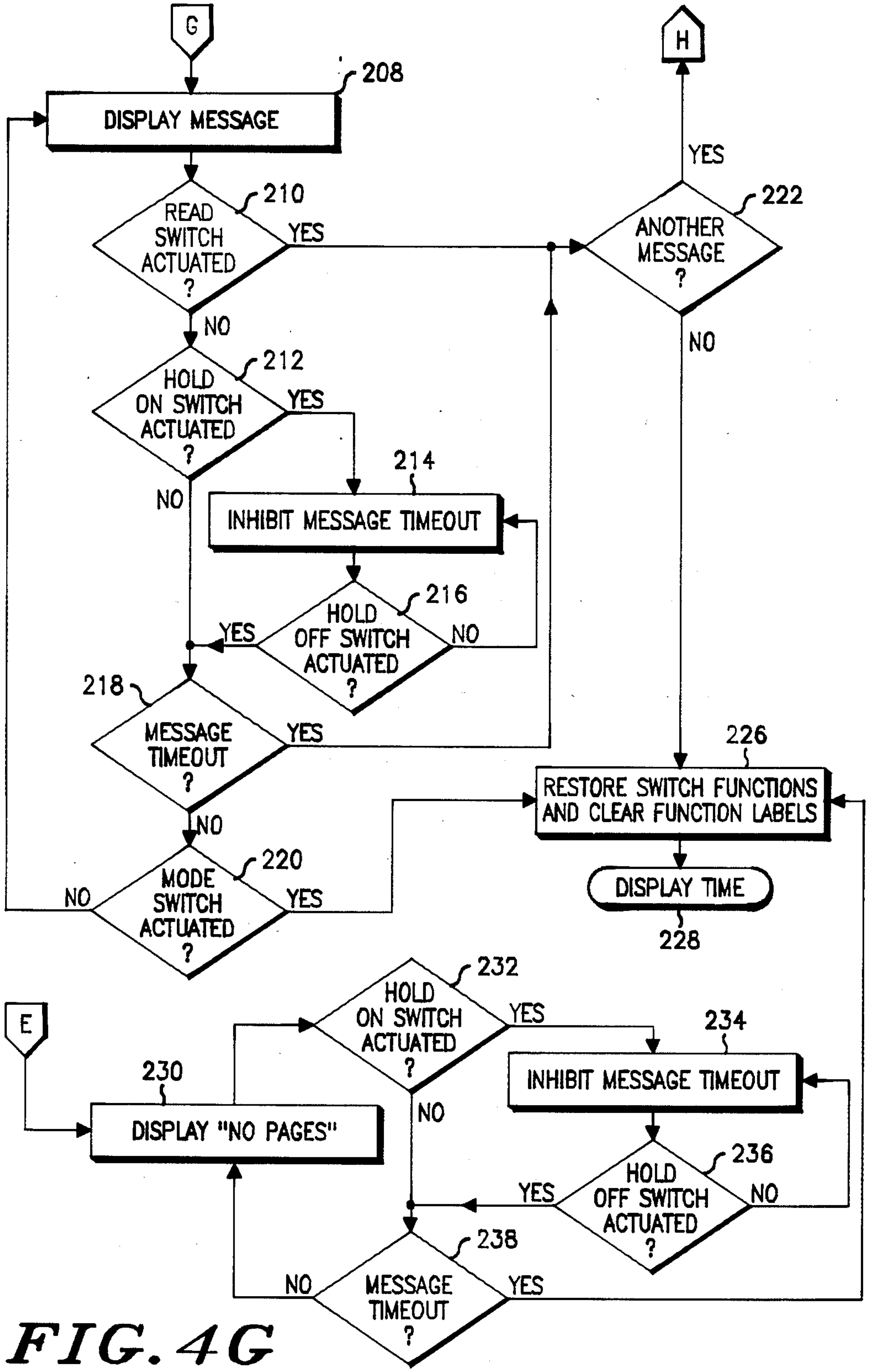

Reference in now directed to the flowchart shown in FIGS. 4F and 4G describes the procedure for reading out messages stored in the memory 30. The message readout procedure shown starting at block 176 when entered initializes the timing generator 36 as shown at block 202, thereby extending the display time duration a complete time interval. If a message has been stored as shown at block 204 the message is readout from memory as shown in block 206 and displayed on the display as shown in block 208. When the display switch 40, having the "Read" switch 52 function, is actuated as shown at block 210, memory is check for the presence of any additional messages as shown at block 222. If additional messages are stored, the timeout generator is reinitialized as shown at block 224, the next message is read as shown at block 206, and the message is displayed on the display as shown at block 208. This procedure is repeated until all messages stored in memory are read out. If another message was not stored in memory as shown in block 222, then the normal switch functions are restored, and the displayed switch labels are cleared as shown at block 226, thereby returning the device to the normal time display mode shown at block 228, thereby ending the message readout procedure started at block 176. When the set switch 42, having the "Hold On" switch 50 function, is actuated as shown at block 212 while the message is being displayed, the message timeout is inhibited as shown at block 214. The message will remain displayed on the display until the set switch 42, having the "Hold Off" switch 54 function, is actuated as shown at block 216. If the set switch 42, having the "Hold On" switch 50 function, was not actuated as shown at block 212, then message timeout may occur as shown at block 218. Memory is checked for the presence of additional messages as shown at block 222, and any additional messages stored are displayed as previously described If mode switch 44, having the "Time" select switch 48 function, is actuated as shown at block 220 then the normal switch functions are restored, and the displayed switch labels are cleared as shown at blook 226, thereby returning the device to the normal time display mode shown at block 228, thereby ending the message readout procedure started at block 176.

Since it is possible to enter the message readout procedure by manually actuating the mode switch 44 as previously described at block 172, no messages may be stored as shown at block 204. When no messages are stored, the display would indicate the text "No Pages" as shown at block 230. When the set switch 42, having the "Hold On" switch 50 function, is actuated as shown in block 232, the message timeout is inhibited as shown in block 234 freezing the "No Pages" display. When the set switch 42, having the "Hold Off" switch 54 function, is actuated as shown in block 236, message timeout can occur as shown at block 238, at which time the then the normal switch functions are restored, and the displayed switch labels are cleared as shown at block 226, thereby returning the device to the normal time display mode shown at block 228, thereby ending the message readout procedure started at block 176.

An alternate embodiment of the watch-pager device 10 is described in the flow charts shown in FIGS. 5A through 5D. Since most of the operation of the alternate embodiment of the device described in FIGS. 5A through 5D have been previously described with respect to FIGS. 4D through 4G, respectively, only the differences in operation will be described in detail here.

Figure 5A:
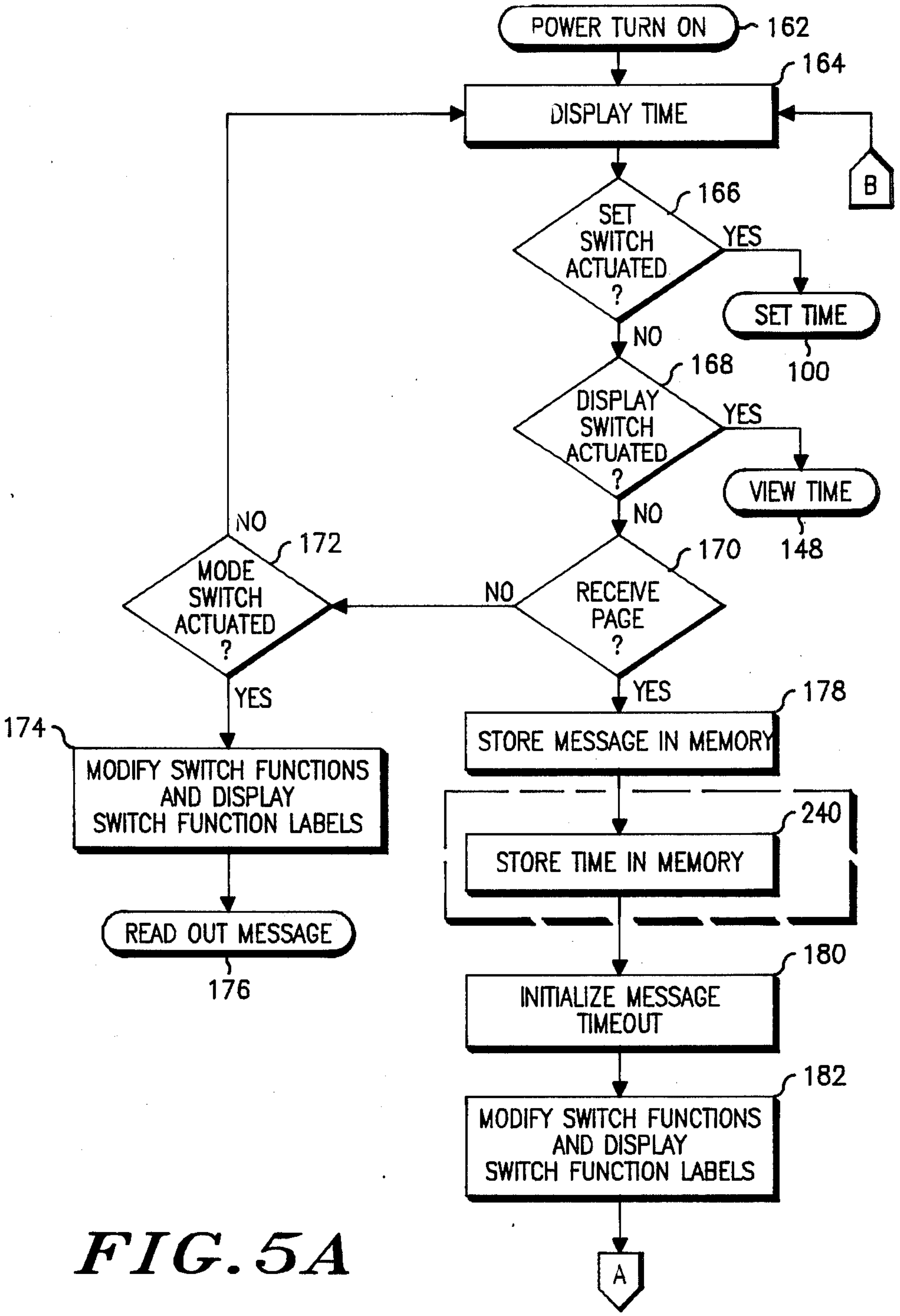
FIGS. 5A to 5D are flow diagrams illustrating the operation of an alternate embodiment of the apparatus of the present invention.
Figure 5B:
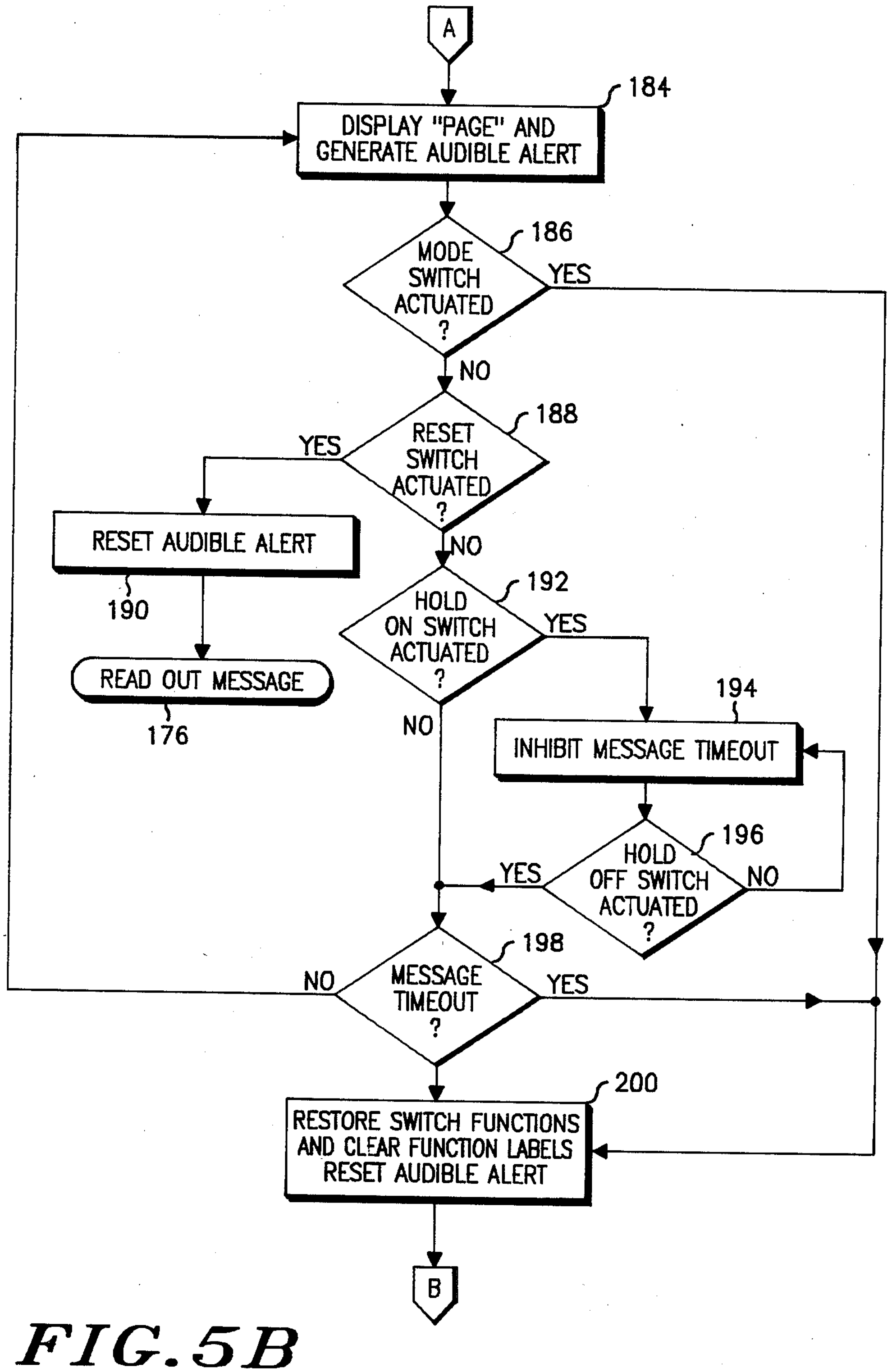

Reference is directed to the flowchart shown in FIGS. 5A and 5B, and in particular to block 240, identified by a broken line outline, which shows that the time is stored in memory 30 after the received message was stored in memory 30 as shown at block 178. All other operations illustrated in the flow chart were previously described.

Figure 5C:
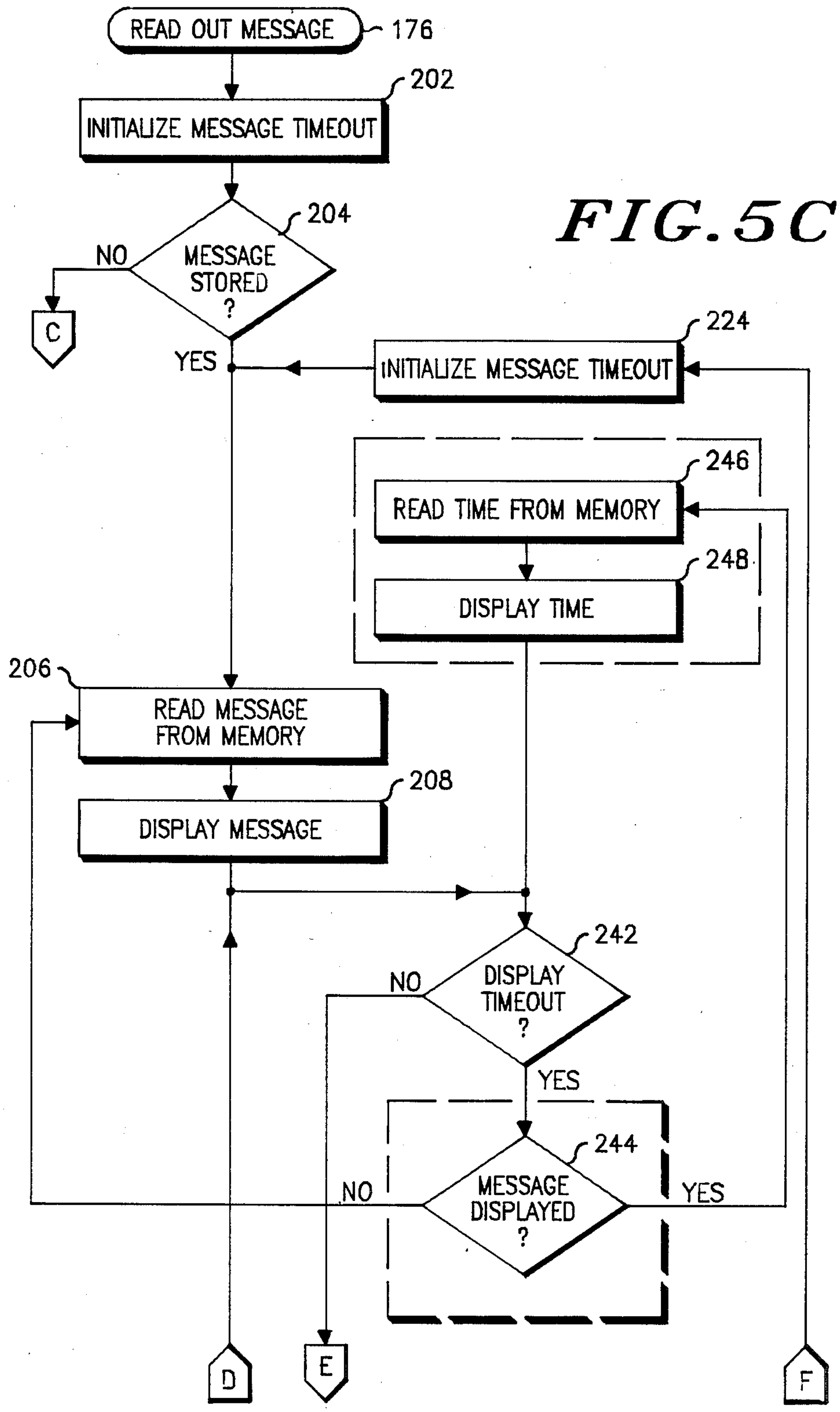
Figure 5D:
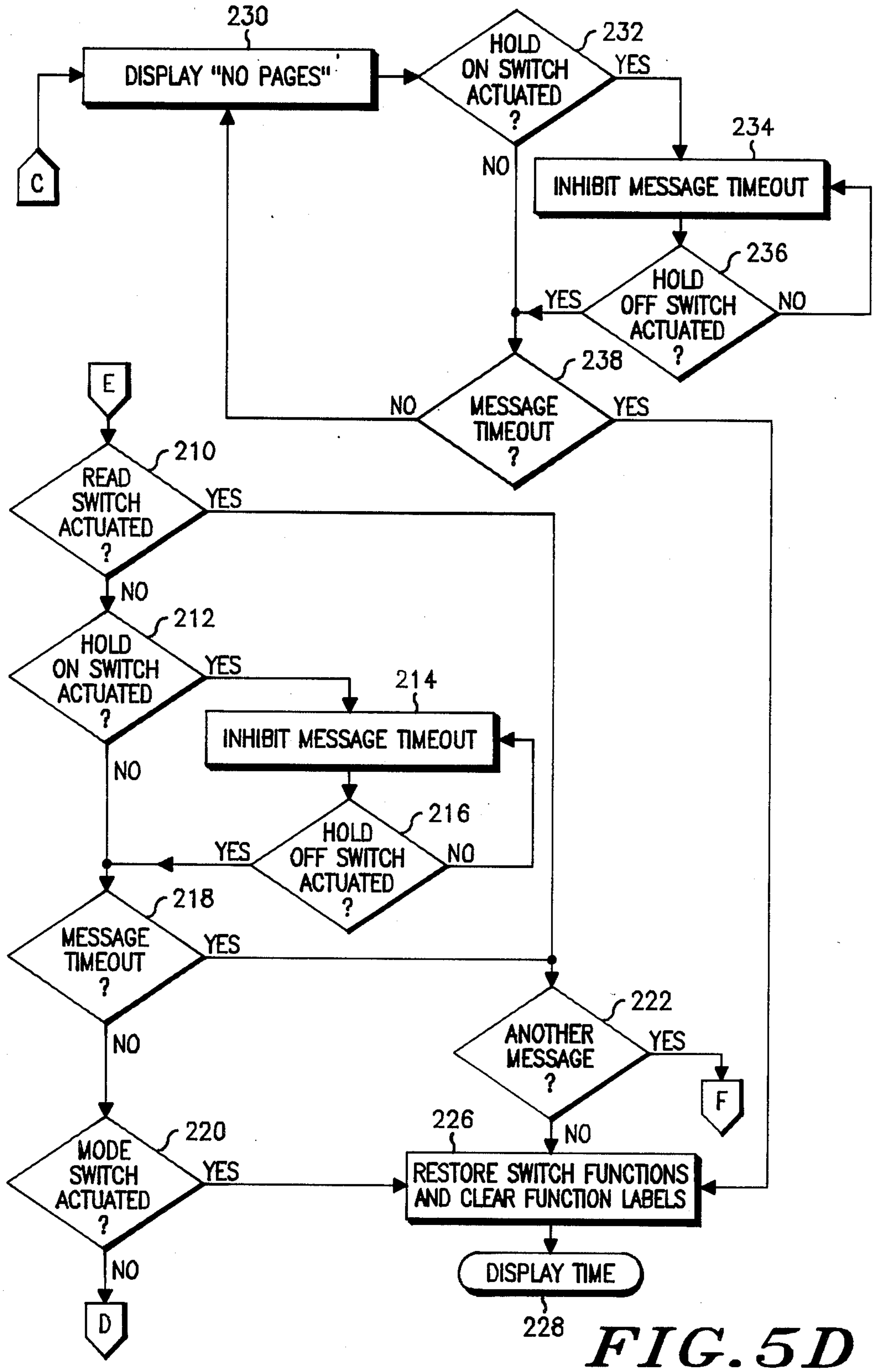

Reference is directed to the flowchart shown in FIGS. 5C and 5D and in particular to block 206 which shows the received message is first read from before 30 and then displayed as shown at block 208. The received message is displayed until a display timeout occurs as shown at block 242. The information displayed when the timeout occurs is checked as shown at block 244. Since the information displayed was a received message, the stored time information is read from memory 30 as shown at block 246 and displayed as shown at block 248. The next time the display timeout occurs as shown at block 242 the information displayed is again checked as shown at block 244. Since time information was displayed then the received message is again read from the memory 30 as shown at block 206 and displayed as shown at block 208, thus resulting in an alternating display of the received message and the received time. All other operation within the flowchart are as has been previously described.

By providing the ability to store the time at which a message is received, it is possible to review the stored messages and to respond to them in an order of priority which is based upon the receipt of the earliest message with respect to the time received. This feature enhances the utility of a pager which has watch functions incorporated into it.

Figure 6:
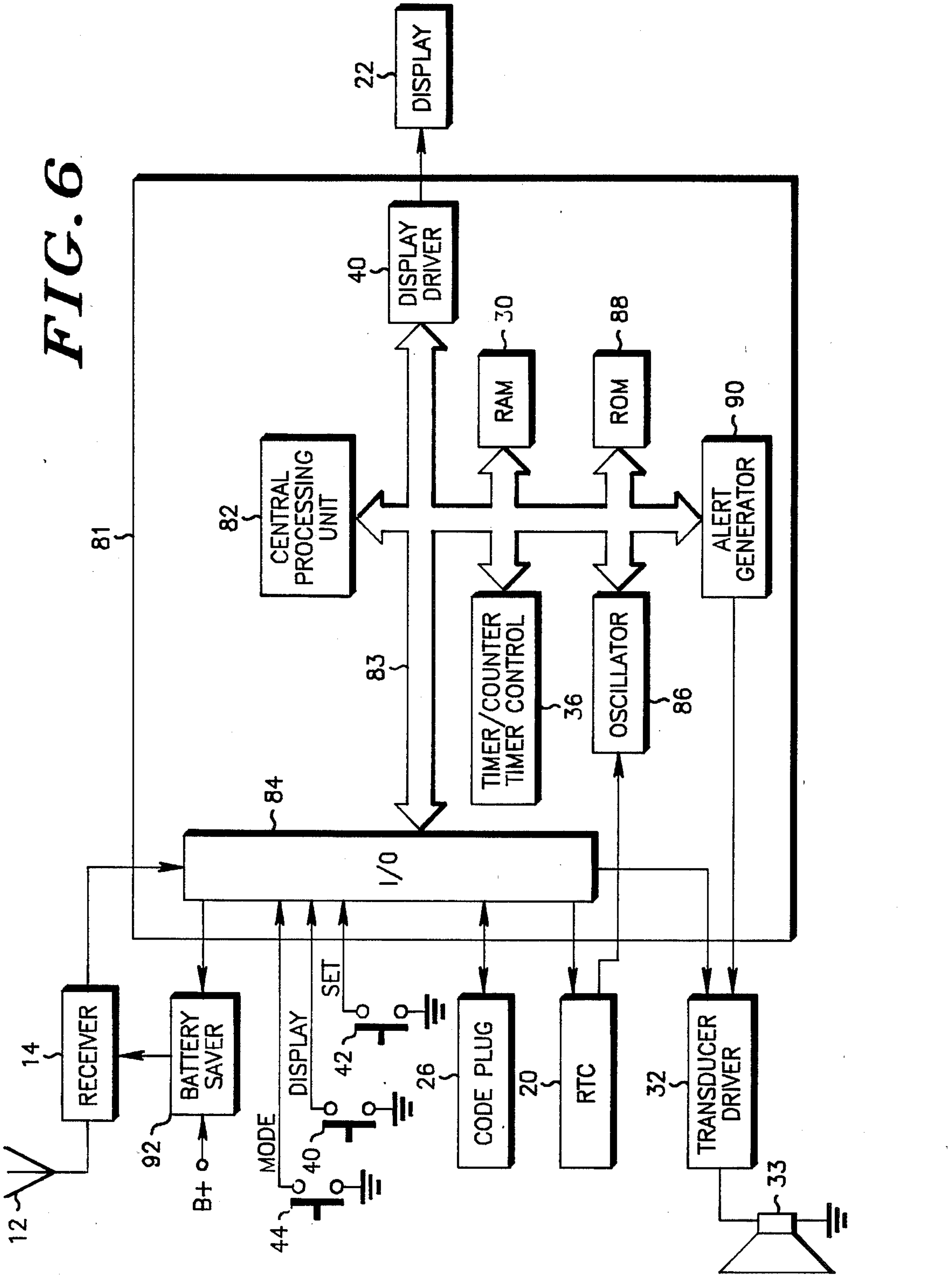
FIG. 6 is a functional block diagram of an embodiment of the present invention utilizing a microprocessor for controlling the operation of the apparatus.

Referring now to FIG. 6, illustrated is an electrical block diagram of the apparatus of the present invention utilizing a microcomputer 81 for controlling the operation of the apparatus of the watch-pager 10 previously described. Microcomputer 81 performs the combined functions of display controller 16, including those of switch interface controller 34, timing generator 36, display selector 38 and display interface 40, as well as the functions of decoder 28 and memory 30 of paging receiver 14 for the embodiment previously shown in FIG. 2.

Operation of the embodiment of the present invention as shown in FIG. 6 is as follows. Microcomputer 81 is a single chip microcomputer, such as the MC68HC05L6 manufactured by Motorola. Microcumputer 81 includes a CPU 82 for operational control. An internal buss 83 connects all of the elements of the microcomputer 81. An I/O port 84 provides communications to the circuits external to the microcomputer 81. A timer/counter and timer control 36 generates the display time duration interval for controlling the length of time the received message is displayed. Oscillator 86 provides the clock for operation of CPU 82, provides the reference clock for timer/counter 36, and provides the clock signals necessary to drive the on-board serial display driver 40. Oscillator 86 receives the operating oscillator frequency signal from real time clock 20. RAM 30 stores the messages as they are received for subsequent display as previously described. ROM 88 contains the firmware controlling microprocessor 81 operation. Programs, such as for decoding, for time setting and display, for message storage and display and for controlling the switch operations and displayed indicia, are included in ROM 88. An alert generator 90 provides the alerting signal in response to decoding the selective call signal information. And the on-board serial display driver 40 provides the proper signals for driving display 22.

Transmitted coded message signals including selective call signalling and message information are received by antenna 12 which is coupled to receiver 24. Receiver 24 demodulates the coded message signals providing selective call signalling and message information. The output of receiver 24 is coupled to I/O port 84 of microcomputer 81. Also coupled to I/O port 84 is code plug, or code memory 26 which stores the predetermined addresses for the watch-pager 10, as previously described. Microcomputer 81 provides the decoder function, in a manner well known to those skilled in the art, providing internal control signals when the received selective call signalling matches the predetermined address information.

The message information received is stored in RAM 30. Alert generator 90 generates an alerting signal which is coupled to transducer driver 32. A second input to transducer driver 32 from I/O port 84 controls the alerting signal delivery to transducer 33, producing an audible alert. The second input to transducer driver 32 provides for such features as silent alerting, wherein the message is received and stored, however the alerting signal is inhibited from delivery to transducer 33. Selection of the silent alerting feature would be indicated by the absence of the audible alert annunciator 74, shown in FIG. 3C. Other features, such as interrupting the audible alert are also controlled by the second input. ROM 88 is also read for the text information to be displayed indicating a message has been received. Information is also provided the display driver for properly displaying message annunciator 70 and cursor 72, and the switch labels, as previously described.

Display switch 40, set switch 42 and mode switch 44 are coupled to microcomputer 81 through I/O port 84 for providing control the the messages while the paging receiver mode of operation has been selected by microcomputer 81. After the received message has been read, or after the display time duration has elapsed, as previously described, microcomputer 81 resumes time display A real time clock 20, such as the MC146818, manufactured by Motorola, provides all of the timing functions for the watch-pager 10, as well as provides the oscillator signal required for operation of the microcomputer 81. The real time clock provides the time, and day/date information which is updated once each second and read by microcomputer 81 for subsequent display. Readout and setting of the information of real time clock 20, is accomplished in a manner as previously described using display switch 40 and set switch 42. Other features such as alarm features are also provided by real time clock 20.

One additional circuit which is valuable for the operation of a watch-pager 10 which is worn on the wrist is battery saver circuit 92, not previously described in FIG. 2, although its inclusion would be obvious to one skilled in the art. Under control of microcomputer 81, the battery saver circuit 92 is periodically turned on and off, thereby conserving power by removing power from the receiver 24. The microcomputer 81 is able to periodically update the time display, and periodically control the battery saver circuit 92. If coded message signals are detected on the channel when receiver 24 is turned on by battery saver circuit 92, microcomputr 81 will suspend the operation of battery saver circuit 92 operation, until the coded message signals have been evaluated. As previously described, if the coded message signals match the predetermined address information, display of time information will be suspended, and operation of the switches returned to control the receiver and message delivery.

What is claimed is:

1. A switch control interface arrangement for a device normally generating and displaying time information, the device having a plurality of switches for controlling the time display, the switches including permanent indicia positionally adjacent the switches for indicating the switch functions, the device being further capable of receiving transmitted coded message signals, said arrangement comprising:

receiver means for receiving and decoding the transmitted coded message signals to derive control signals;

means for internally generating time information and means for displaying the same;

a plurality of control inputs; and switch controller means including input steering means coupled to said plurality of control inputs and further coupled to said time information generating means and to said receiver means for enabling control of said time information generating means and said receiver means by said control inputs, said switch controller means enabling control of said receiver means in response to the control signals, and information selecting means electronically selecting indicia displayed on said display means positionally adjacent the plurality of switches indicating the new switch functions enabled in response to the control signals.

2. The switch control interface arrangement according to claim 1 wherein said plurality of control inputs are coupled to the plurality of switches.

3. A switch control interface arrangement according to claim 2 wherein the transmitted coded message signals includes selective call signalling and wherein said receiver means comprises;

a receiver portion for receiving and demodulating the transmitted coded message signals to derive the selective call signalling and message information;

identification means for storing predetermined device identification information; and decoder means coupled to said identification means and responsive to the selective call signalling information for deriving control signals when the selective call signalling information matches the predetermined device identification information.

4. The switch control interface arrangement according to claim 3 wherein said decoder means further includes means for generating an alerting signal coupled to said switch controller means and said receiver means further includes alert delivery means coupled to said switch controller means, said switch controller means effecting the delivery of the alerting signal in response to the control signals.

5. A switch control interface arrangement according to claim 4 wherein the alerting signal delivered is audible.

6. A switch control interface arrangement according to claim 4 wherein said decoder means is responsive to said input steering means for interrupting the alerting signal in response to actuation of one of the plurality of switches.

7. The switch control interface arrangement according to claim 3 Wherein said receiver means further comprises memory means coupled to said receiver portion and responsive to said decoder means for storing alert information in response to the control signals.

8. The switch control interface arrangement according to claim 7 wherein said memory means is further responsive to said decoder means which is responsive to said switch controller means for effecting the delivery of the stored alert information in response to actuation of one of the plurality of switches.

9. The switch control interface arrangement according to claim 2 wherein said switch controller means further comprising switch duration generating means for enabling control of said receiver means for a predetermined time duration in response to the control signals.

10. The switch control interface arrangement according to claim 9 wherein said switch duration generating means is further responsive to at least one of the plurality of switches when the alert information is delivered for interrupting the control of said receiver means thereby effecting the display of time information.

11. The switch control interface arrangement according to claim 9 wherein said switch duration generating means is further responsive to at least one of the plurality of switches when time information is displayed for effecting enabling of control of said receiver means thereby effecting the delivery of alert information.

12. The switch control interface arrangement according to claim 1 wherein the time information represents at least time and date watch functions.

13. The switch control interface arrangement according to claim 1 wherein the device may be worn on the wrist.

14. A display control interface arrangement for a device normally generating and displaying time information, the device having a plurality of switches for controlling the time display, the switches including permanent indicia positionally adjacent the switches for indicating the switch functions, the device being further capable of receiving transmitted coded message signals, said arrangement comprising:

receiver means for receiving and decoding the transmitted coded message signals to derive control signals and information;

means for internally generating time information and means for displaying the same;

input steering means coupled to the plurality of switches and further coupled to said time information generating means and to said receiver means for enabling control of said time information generating means and said receiver means by said switches, said input steering means enabling control of said receiver means in response to the control signals;

information selecting means coupled to said time information generating means and to said receiver means for selecting the display of time information and derived information, said information selecting means responsive to said input steering means for selecting the display of derived information in response to the control signals, said information selecting means further electronically selecting indicia displayed on said display means positionally adjacent the plurality of switches indicating the new switch functions enabled in response to the control signals; and display interface means coupled to said display means and responsive to said information selecting means for effecting the display of selected information.

15. A display control interface arrangement according to claim 14 wherein the derived information displayed in response to the control signals is derived from the transmitted coded message signals.

16. A display control interface arrangement according to claim 15 wherein the transmitted coded message signals includes at least selective call signalling and message information and wherein said receiver means comprises;

a receiver portion for receiving and demodulating the transmitted coded message signals to derive the selective call signalling and message information;

identification means for storing predetermined device identification information; and decoder means coupled to said identification means and responsive to the selective call signalling information for deriving the control signals when the selective call signalling information matches the predetermined device identification information.

17. A display control interface arrangement according to claim 16 wherein said receiver means further comprises memory means coupled to said receiver portion and responsive to said decoder means for storing the message information in response to the control signals.

18. A display control interface arrangement according to claim 17 wherein said memory means is further responsive to the decoder means which is responsive to said input steering means for effecting the display of the stored message information in response to actuation of one of the plurality of switches.

19. The display control interface arrangement according to claim 14 whereby said information selecting means is capable of selecting multiple indicia selectively displayed on said display means positionally adjacent at least one of the plurality of switches indicating the switch functions selectively enabled in response to the actuation of the one switch when the message information is displayed.

20. The display control interface arrangement according to claim 16 wherein said decoder means further includes means for generating an alerting signal coupled to said information selecting means and said receiver means further includes alert delivery means coupled to said information selecting means, said information selecting means effecting the delivery of the alerting signal in response to the control signals.

21. The display control interface arrangement according to claim 20 wherein the alerting signal delivered is audible.

22. The display control interface arrangement according to claim 20 wherein said decoder means is responsive to said input steering means for interrupting the alerting signal in response to actuation of one of the plurality of switches.

23. The display control interface arrangement according to claim 16 wherein said display controller means further comprising display duration generating means coupled to said input steering means for enabling control of said receiver means for a predetermined time duration in response to the control signals.

24. The display control interface arrangement according to claim 23 wherein said display duration generating means is further responsive to at least one of the plurality of switches when the message information is displayed for interrupting the control of said receiver means thereby effecting the display of time information.

25. The display control interface arrangement according to claim 23 wherein said display duration generating means is further responsive to at least one of the plurality of switches when time information is displayed for effecting the enabling of control of said receiver means thereby effecting the display of message information.

26. The display control interface arrangement according to claim 14 wherein the time information represents at least time and date watch functions.

27. The display control interface arrangement according to claim 14 wherein the device may be worn on the wrist.

28. A display control interface arrangement for a wrist worn device normally generating and displaying time information, the device having a plurality of switches for controlling the time display, the switches including permanent indicia positionally adjacent the switches for indicating the switch functions, the device being further capable of receiving transmitted coded message signals including selective call signalling and message information, said arrangement comprising:

receiver means including a receiver portion, identification means and decoder means, said receiver portion for receiving and demodulating the transmitted coded message signals to derive selective call signalling and message information, said identification means for storing predetermined device identification information, and said decoder means coupled to said identification means and responsive to the selective call signalling information for deriving control signals when the selective call signalling matches the predetermined device identification information;

means for internally generating time information and means for displaying the same;

input steering means coupled to the plurality of switches and further coupled to said time information generating means and to said receiver means for enabling control of said time information generating means and said receiver means by said switches, said input steering means enabling control of said receiver means in response to the control signals;

information selecting means coupled to said time information generating means and to said receiver means for selecting the display of time information and message information, said information selecting means responsive to said input steering means for selecting the message information in response to the control signals, said information selecting means further electronically selecting indicia displayed on said display means positionally adjacent the plurality of switches indicating the new switch functions enabled in response to the control signals; and display interface means coupled to said display means and responsive to said information selecting means for effecting the display of selected information.

29. The display control interface arrangement according to claim 28 wherein said receiver means further comprises memory means coupled to said receiver portion and responsive to the decoder means for storing the message information in response to the control signals.

30. The display control interface arrangement according to claim 29 wherein said memory means is further responsive to said decoder means which is responsive to said input steering means for effecting the display of the stored message information in response to actuation of one of the plurality of switches.

31. The display control interface arrangement according to claim 28 wherein said decoder means further includes means for generating an alerting signal coupled to said information selecting means and said receiver means further includes alert delivery means coupled to said information selecting means, said information selecting means effecting the delivery of the alerting signal in response to the control signals.

32. The display control interface arrangement according to claim 31 wherein the alerting signal delivered is audible.

33. The display control interface arrangement according to claim 31 wherein said decoder means is responsive to said input steering means for interrupting the alerting signal in response to actuation of one of the plurality of switches.

34. The display control interface arrangement according to claim 28 wherein said display controller means further comprising display duration generating means coupled to said input steering means for enabling control of said receiver means for a predetermined time duration in response to the control signals.

35. The display control interface arrangement according to claim 34 wherein said display duration generating means is further responsive to at least one of the plurality of switches when the message information is displayed for interrupting the control of said receiver means thereby effecting the display of time information.

36. The display control interface arrangement according to claim 34 said display duration generating means is further responsive to at least one of the plurality of switches when time information is displayed for effecting enabling of control of said receiver means thereby effecting the display of message information.

37. The display control interface arrangement according to claim 38 wherein the time information represents at least time and date watch functions.

38. A method for controlling the display on a device normally generating and displaying time information, the device having a plurality of switches for controlling the time display, the switches including permanent indicia positionally adjacent the switches for indicating the switch functions, the device further capable of receiving transmitted coded message signals, said method comprising the steps of:

receiving and decoding the transmitted coded message signals to derive control signals and message information;

modifying the functions of the switches in response to the control signals; and electronically selecting indicia and displaying the same positionally adjacent the switches indicating the new switch functions, whereby in response to receiving and decoding the coded message signals, the switch functions are changed allowing display of the derived message information.

39. The method of controlling the display on a device according to claim 38 further comprising the steps of:

storing the derived message information in response to the control signals;

displaying predetermined alphanumeric text indicating a message has been received in the place of the time information in response to the control signals; and generating an audible alert in response to the control signals, whereby the message information received is stored and audible and visual indications are provided.

40. The method of controlling the display on a device according to claim 39 further comprising the steps of:

actuating a first switch for suspending the display of the predetermined alphanumeric text and the generation of the audible alert and selecting the display of stored message information; and displaying the stored message information, whereby the stored message information is displayed when the first switch of the plurality of switches is actuated.

41. The method of controlling the display on a device according to claim 39 further comprising the steps of:

actuating a second switch suspending the display of the predetermined alphanumeric text and the generation of the audible alert for effecting the display of time information;

restoring the switches to the original functions; and cancelling the display of the electronically selected indicia, whereby time information is again displayed and the display of the stored message information is terminated when the second switch of the plurality of switches is actuated.

42. The method of controlling the display of a device according to claim 41 further comprising the steps of:

actuating a second switch to manually select the display of stored message information when time information is displayed;

electronically selecting indicia and displaying the same positionally adjacent the switches indicating the new switch functions in response thereto; and displaying the stored message information, whereby stored message information may be displayed when time information is displayed by actuating the second switch.

43. The method of controlling the display on a device according to claim 39 further comprising the steps of:

generating a predetermined time period in response to the control signals;

modifying the functions of the switches and electronically selecting indicia electronically and displaying the same positionally adjacent the switches indicating the new switch functions during the predetermined time period;

generating an audible alert during the predetermined time period;

displaying predetermined alphanumeric text indicating a message has been received during the predetermined time period displaying time information upon completion of the predetermined time period; and restoring the switches to the original functions, whereby the display of stored message information is automatically terminated when a first switch is not actuated to display message information during the predetermined time period.

44. The method of controlling the display of a device according to claim 43 further comprising the steps of:

actuating a first switch to select the display of message information during the predetermined time period;

reinitializing the predetermined time period; and displaying the message information, whereby stored message information may be displayed during the predetermined time period by actuating the first switch.

45. The method of controlling the display of a device according to claim 43 further comprising the steps of:

actuating a second switch for suspending the display of predetermined alphanumeric text and selecting the display of the time information before completion of the predetermined time period; and restoring the switches to the original functions;

cancelling the display of the electronically generated idicia, whereby the display of the stored message information is terminated during the predetermined time period when the second switch is actuated.

* * * * *